2,693,496

SELECTIVE REMOVAL OF ACETYLENE FROM ETHYLENE-CONTAINING GASES

E. O. Box, Jr., Bartlesville, Okla., assignor to Phillips Petroleum Company, a corporation of Delaware No Drawing. Application December 21, 1951,
Serial No. 262,911

4 Claims. (Cl. 260—677)

This invention relates to the removal of acetylene from ethylene-containing gases or hydrocarbon streams. In one of its aspects the invention relates to a process for the removal of acetylene from hydrocarbon gases also containing ethylene employing a catalyst novel for this purpose. In another of its aspects the invention relates to the removal of acetylene from ethylene-containing gases or hydrocarbon streams employing a selective polymerization process which includes the employ of a catalyst novel for this purpose at a temperature specific for this purpose and under certain other herein specified conditions.

The production of ethylene by cracking of paraffinic hydrocarbons such as propane and butane at relatively high temperatures is a well known process. In these cracking processes high yields of ethylene are obtained; however, other olefins and acetylene are also produced along with the ethylene. In most instances, acetylene is highly undesirable in an ethylene-containing hydrocarbon stream, since it is deleterious in a great many of the processes in which ethylene is used as a feed stock. In some processes, acetylene acts as a catalyst poison and causes a loss of catalyst life and lower yields of products. In other processes, the presence of acetylene gives rise to objectionable side reactions and to the deposition of carbon.

The removal of the olefinic hydrocarbon impurities from the ethylene product stream is obtained by the usual fractionation procedures; however, acetylene is a very difficult material to separate from ethylene and the removal of this impurity is not so readily accomplished by usual methods of operation. The boiling points of ethylene and acetylene are very close together so that a separation of these components by fractionation is very poor. The absorption characteristics of ethylene and acetylene are also quite similar and a separation process by this means is almost impossible. Consequently, it is usually desirable in most instances to reduce the acetylene content of ethylene-containing streams by methods other than fractionation or adsorption.

I have now discovered that the acetylene content of an ethylene-acetylene hydrocarbon stream may be very greatly reduced without destroying material quantities of the ethylene present by passing said hydrocarbon stream at moderately high space velocities and elevated temperatures in the range of 300 to 425° C. over a catalyst comprising an admixture of chromium oxide and calcium nickel phosphate in order to effect a polymerization reaction of the acetylene content of the hydrocarbon stream. The process of my invention can be effected at atmospheric pressures, but slightly superatmospheric or subatmospheric pressures can be employed. The exact process conditions to be used in the particular application of my process will be determined by such factors as flow velocity of the gaseous mixture over the catalyst, composition of the gaseous mixture being treated, permissible acetylene content of the treated gas, and previous use of the catalyst.

Therefore, according to this invention an ethylene-containing gas also containing acetylene is freed of acetylene by passing said gas into contact with a catalyst comprising chromium oxide and calcium nickel phosphate to effect a selective polymerization of the acetylene under conditions of temperature, time and pressure as set out herein.

The temperature at which the process is effected is critical. Thus at a too-low temperature the amount of polymerization effected in presence of the catalyst will be insufficient to properly remove the acetylene without removing the ethylene. At a too high temperature it is not possible so to control the other interrelated conditions of time, pressure, catalyst characteristics, etc. as to avoid destroying or otherwise undesirably converting the ethylene in the gases. Therefore, it is essential to maintain the temperature of the polymerization zone in the range of 300–425° C., preferably 350–420° C., more preferably 370–405° C.

The space velocity of the gases over the catalyst must be carefully controlled in respect of each of the other variable of the process. A space velocity in the range of 200–800 volumes of gas per volume of catalyst per hour, preferably 350–450 volumes of gas per volume of catalyst per hour should be employed for best results, the higher space velocities being employed with the higher temperatures in the said ranges of space velocity and temperature.

As stated the pressure of the gases in presence of the catalyst will be at or near to atmospheric. It should be noted however that the partial pressures of the ethylene and the acetylene may, in some cases, somewhat alter the best acetylene removal obtainable without substantially affecting the ethylene in an undesirable manner.

The preparation of the chromium oxide-calcium nickel phosphate catalyst used in the practice of my invention is adequately described by Britton and Dietzler in U. S. Patent 2,442,320. This catalyst is presently available commerically as Dow B dehydrogenation catalyst, and a typical analysis is given as 88.7 weight per cent calcium phosphate, 10.4 weight per cent nickel phosphate, and 0.9 weight per cent chromium oxide. The formation of the catalyst involves precipitation under neutral or alkaline conditions from an aqueous solution of soluble calcium and nickel salts in admixture with a water-soluble ortho-phosphate, such as ortho-phosphoric acid, filtration and washing of the precipitate, and drying of the precipitate at a temperature between 60 and 150° C. The chromium oxide is added either to the wet precipitate and thereafter dried or to the previously dried precipitate. After extensive use, the catalyst may accumulate a small amount of carbon or non-volatile organic material and become less active. Accordingly, the catalyst may be reactivated by blowing air, admixed with an equal volume of steam, through the catalyst bed at temperatures between 450 and 700° C.

The process of the invention is not limited to the precise catalyst composition just indicated. Thus, the chromium oxide ($Cr_2O_3$) can be 0.1–5 weight per cent of the catalyst, the nickel phosphate can be 5–15 weight per cent of the catalyst and the remainder calcium phosphate. It is noted that the chromium oxide can be applied to the remainder of the catalyst. Therefore, the manner of adding the chromium oxide to the rest of the catalyst may, in some cases, affect the activity thereof. In any event the catalyst of the invention can be a dry admixture, as described above, or the chromium oxide can be added at any stage of the formation of the catalyst taking into account that a sufficient proportion of the said oxide shall be available to the gases.

Example

A mixture of 2.4 volume per cent acetylene, 39.1 volume per cent ethylene, and 58.5 volume per cent methane was passed over 41.5 grams of chromium oxide-calcium nickel phosphate catalyst at a temperature between 373 and 403° C. and a flow rate of 184 cc. per minute (approximately 400 volumes of gas per volume of catalyst per hour) under atmospheric pressure for 2.25 hours. The effluent from the reaction zone contained 0.2 volume per cent acetylene, 39.4 volume per cent ethylene, and 60.4 volume per cent methane. This analysis indicates no destruction of ethylene.

Reasonable variation and modification are possible within the scope of the foregoing disclosure and the appended claims to the invention the essence of which is that there has been set forth a process for the removal of acetylene from gases containing the same together with ethylene by passing the said gases into contact with a catalyst novel for this purpose, namely a catalyst comprising chromium oxide and calcium nickel phosphate at a temperature in the range 300–425° C. in a manner and under other conditions as set forth and described herein.

I claim:
1. The removal of acetylene from an ethylene-containing gas also containing acetylene by passing said gas into contact with a catalyst comprising chromium oxide and calcium nickel phosphate at a temperature in the range 300–425° C.
2. The removal of acetylene from a gaseous mixture containing ethylene and acetylene by passing said mixture into contact with a catalyst consisting essentially of 0.1–5 weight per cent of chromium oxide, 5–15 weight per cent of nickel phosphate and the remainder calcium phosphate at a temperature in the range 300–425° C.
3. The removal of acetylene from a mixture of hydrocarbons containing a relatively minor proportion of acetylene and a substantial proportion of ethylene which comprises passing the gases over a chromium oxide-calcium nickel phosphate catalyst at a temperature in the range 350–420° C. at a space velocity such that the acetylene is selectively polymerized from the said gases without substantially adversely affecting the ethylene.
4. A process for the removal of acetylene according to claim 2 wherein said temperature is in the range 370 to 405° C.

References Cited in the file of this patent
UNITED STATES PATENTS

| Number | Name | Date |
|---|---|---|
| 1,836,927 | Linckh et al. | Dec. 15, 1931 |
| 1,842,010 | Braus | Jan. 19, 1932 |
| 2,154,676 | Haeuber et al. | Apr. 18, 1939 |
| 2,456,367 | Britton et al. | Dec. 14, 1948 |
| 2,440,236 | Stirton | Apr. 27, 1948 |
| 2,636,911 | Ray | Apr. 28, 1953 |